United States Patent [19]
Koike et al.

[11] Patent Number: 5,997,984
[45] Date of Patent: Dec. 7, 1999

[54] CORDIERITE HONEYCOMB STRUCTURAL BODY AND METHOD FOR ITS PRODUCTION

[75] Inventors: Kazuhiko Koike; Tomohiko Nakanishi, both of Nishio; Kojiro Tokuda, Kariya, all of Japan

[73] Assignees: Denso Corporation, Kariya; Nippon Soken, Inc., Nishio, both of Japan

[21] Appl. No.: 08/991,244

[22] Filed: Dec. 16, 1997

[30] Foreign Application Priority Data

Dec. 19, 1996 [JP] Japan ................................ 8-355365

[51] Int. Cl.⁶ ............................................. B32B 17/00
[52] U.S. Cl. ......................... 428/116; 428/118; 264/630; 264/631
[58] Field of Search .................... 428/116, 118; 264/630, 631

[56] References Cited

U.S. PATENT DOCUMENTS

| | | |
|---|---|---|
| 4,280,845 | 7/1981 | Matsuhisa et al. ................ 428/116 X |
| 4,434,117 | 2/1984 | Inoguchi et al. . |
| 4,772,580 | 9/1988 | Hamanaka et al. . |
| 4,869,944 | 9/1989 | Harada et al. ........................... 428/116 |
| 5,030,398 | 7/1991 | Hamanaka et al. ............ 264/177.12 X |

FOREIGN PATENT DOCUMENTS

| | | |
|---|---|---|
| 0 232 621 A2 | 8/1987 | European Pat. Off. . |
| 43 39 172 A1 | 5/1994 | Germany . |
| 53-82822 | 7/1978 | Japan . |
| 4-70053 | 11/1992 | Japan . |
| 7-61892 | 7/1995 | Japan . |

*Primary Examiner*—Timothy Speer
*Attorney, Agent, or Firm*—Pillsbury Madison & Sutro LLP

[57] ABSTRACT

There are provided thin-walled honeycomb structural bodies with high strength and excellent thermal shock resistance by using as the starting material for cordierite honeycomb structural bodies a combination of talc with a median particle diameter exceeding 7 $\mu$m and not greater than 20 $\mu$m and with a CaO content of 0.2 wt % or less and another cordierite material such as kaolin with a median particle diameter of not greater than 1 $\mu$m, molding the starting material into a honeycomb shape with a cell wall thickness of 130 $\mu$m or less, and firing the mold.

19 Claims, 2 Drawing Sheets

B AXIS DIRECTION
A AXIS DIRECTION

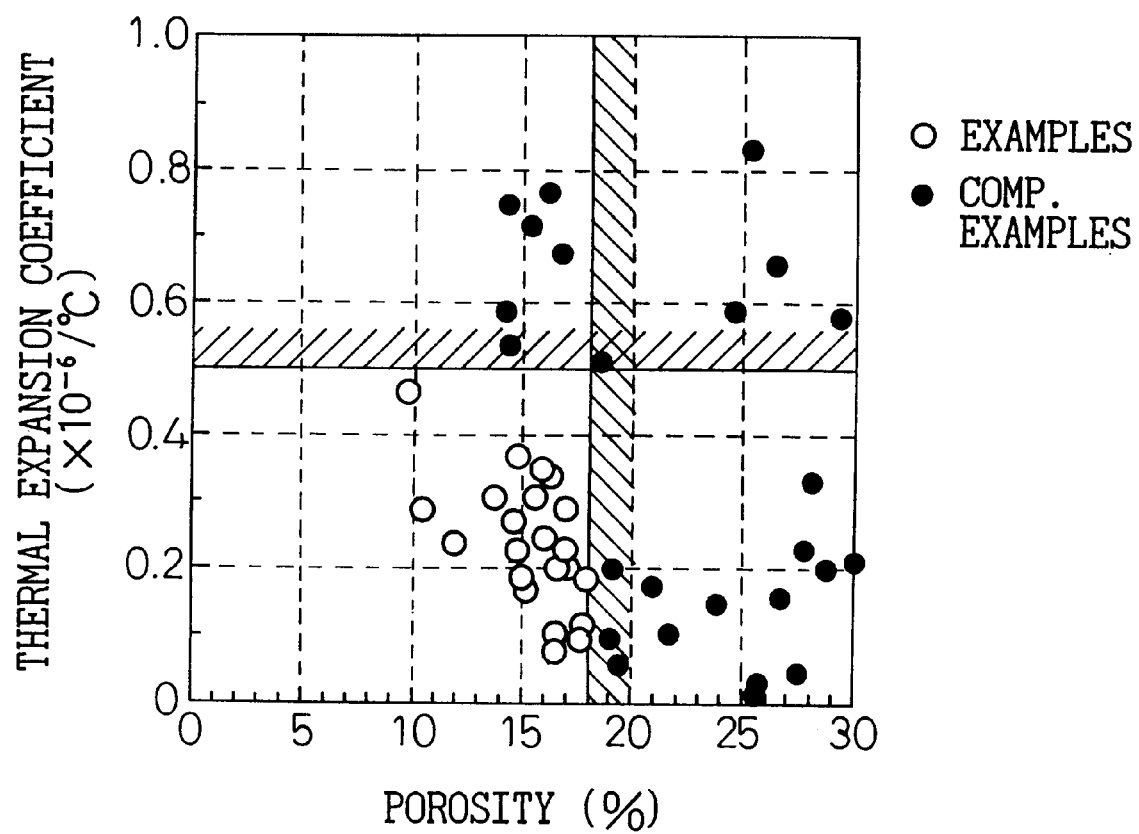

CORDIERITE HONEYCOMB STRUCTURAL BODY AND METHOD FOR ITS PRODUCTION

BACKGROUND OF THE INVENTION

1. Field of the Invention

The present invention relates to a honeycomb structural body which is used as a carrier serving to carry catalysts for the purification of an exhaust gas from internal combustion engines, such as automobile engines, and specifically it relates to a honeycomb structural body composed mainly of cordierite and to a method for its production.

2. Description of the Related Art

Cordierite honeycomb structural bodies have so far been widely used as catalyst carriers in exhaust gas purifiers for internal combustion engines. However, conventional cordierite honeycomb structural bodies are usually thick with cell wall thicknesses of about 170 $\mu$m and because of their large heat capacities, required considerable time to reach the activation temperature of the catalyst from the moment the engine is started, during which period the ejected exhaust gas cannot be purified.

Attempts have therefore been made to provide thinner cell wall thicknesses in order to reduce the heat capacities of cordierite honeycomb structural bodies and thus shorten the time required for catalyst activation. For example, Japanese Examined Patent Publication (Kokoku) No. 4-70053 describes a cordierite honeycomb structural body with a porosity of 30% or lower, obtained by restricting the particle diameters of the talc and kaolin used. However, because this method gives only honeycomb structural bodies with porosities of 18% and higher, when the cell wall thickness is made 70 $\mu$m, or even thinner at 50 $\mu$m, the porosity increases, resulting in a lack of strength, and sometimes leads to damage to the honeycomb structural body due to the load of assembly, etc. during encasing. In addition, the large thermal expansion coefficients on the order of $0.8 \times 10^{-6}/°$ C. for these honeycomb structural bodies have led to the following problems.

When a cordierite honeycomb structural body is used as a catalyst carrier for an exhaust gas purifier, a temperature difference is generated in the catalyst carrier due to heat release by the oxidation reaction of the unburnt hydrocarbons and carbon monoxide present in the exhaust gas. The heat stress generated by this temperature difference is proportional to the thermal expansion coefficient and, with thermal expansion coefficients as large as $0.8 \times 10^{-6}/°$ C., there is a risk of cracking or damage to the catalyst carrier, constituting a significant problem in low thermal shock resistance.

In Japanese Unexamined Patent Publication No. 53-82822 there is described a cordierite ceramic with a thermal expansion coefficient of not greater than $1.6 \times 10^{-6}/°$ C. obtained by restricting the average particle diameter of the talc to 5–150 $\mu$m. However, even the smallest thermal expansion coefficient of this cordierite ceramic is as large as about $0.9 \times 10^{-6}/°$ C., and therefore it has inferior thermal shock resistance.

SUMMARY OF THE INVENTION

It is, therefore, an object of the present invention to provide a cordierite honeycomb structural body with excellent high strength even when the cell wall is made thinner to reduce the heat capacity, and which has a low heat expansion coefficient and excellent thermal shock resistance, as well as a method for producing the same.

As a result of diligent research aimed at overcoming the problems described above, the present inventors have discovered that a cordierite honeycomb structural body which is a honeycomb structural body composed mainly of cordierite, prepared from a starting material comprising talc with a number median particle diameter (hereinafter "number median" will be described as "median") exceeding 7 $\mu$m and not greater than 20 $\mu$m and with a CaO content of 0.2 wt % or less and another cordierite raw material with a median particle diameter of not greater than 1 $\mu$m, which starting material is molded and fired so as to give a cell wall thickness of 130 $\mu$m or less, exhibits high strength and excellent thermal shock resistance.

According to the invention, it is possible to produce small thermal expansion coefficients of not more than $0.5 \times 10^{-6}/°$ C. and vastly improve the compressive strength in the flow channel direction of honeycomb structures by using as the starting material a combination of talc with a median particle diameter exceeding 7 $\mu$m and not greater than 20 $\mu$m and with a CaO content of 0.2 wt % or less and another cordierite raw material with a median particle diameter of not greater than 1 $\mu$m. The "compressive strength in the flow channel direction of a honeycomb structure" is the pressure of a load on a cylinder in the direction of the axis of the cylinder at a crosshead speed of 10 mm/min. when it crushes the cylinder which cylinder has been cut out with 1 inch diameter and 1 inch length from a honeycomb structure, such that the axis of the cylinder is the same direction of the flow channel of the honeycomb structure. In the same way, an "A axis compressive strength" or a "B axis compressive strength" mentioned later is a pressure measured the same way for a cylinder cut out the same size such that the axis of the cylinder is the same direction as an A axis or a B axis direction of the honeycomb. Consequently, since sufficient strength can be maintained (compressive strength of 15 MPa or greater in the flow channel direction of the honeycomb structure (direction indicated by axis A in FIG. 1) with a cell wall thickness of 70 $\mu$m) even when the cell wall thickness is reduced to 130 $\mu$m or below, no destruction occurs due to assembly load, etc. during encasing. Thus, since the thermal capacity can be lowered while maintaining both the strength and the thermal shock resistance, the structure may be utilized as a catalyst carrier for exhaust gas purifiers which allow rapid activation of catalysts.

BRIEF DESCRIPTION OF THE DRAWINGS

FIG. 3 is a graph showing the relationship between porosity and thermal expansion coefficient for the examples of the invention and the comparative examples.

DESCRIPTION OF THE PREFERRED EMBODIMENTS

Figure 1:
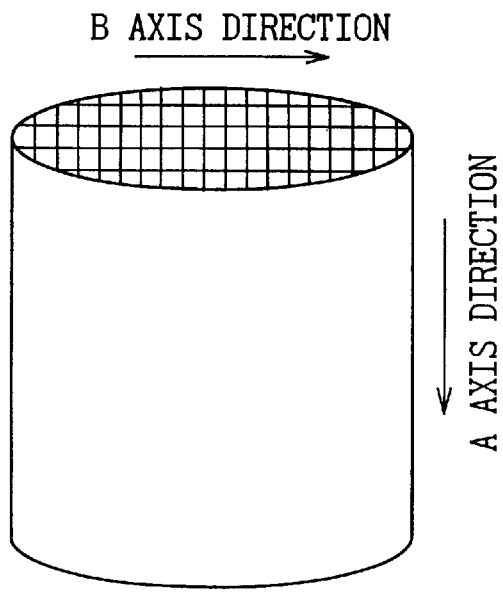
FIG. 1 is an illustration of showing the A axis direction and B axis direction of a honeycomb structural body.

The median particle diameter of the above-mentioned other cordierite raw material is preferably not greater than 0.8 $\mu$m, to give a denser, higher strength honeycomb structural body.

When calcined kaolin is used as the cordierite material, the content of the calcined kaolin in the starting material is preferably 36.5 wt % or lower, to give sufficiently high strength to the cordierite honeycomb structural body.

The cell wall thickness is preferably 100 $\mu$m or less, to allow further reduction in the heat capacity with thinner walls, while maintaining the strength.

The honeycomb structural body of the invention has, specifically, a thermal expansion coefficient of not greater than $0.5 \times 10^{-6}/°$ C. in the flow channel direction, and the porosity of the honeycomb structural body is less than 18%. A thermal expansion coefficient of not greater than $0.5 \times 10^{-6}/°$ C. ensures thermal shock resistance, and a density with a porosity of less than 18% results in high strength.

The cordierite which is the main component of the honeycomb structural body has a composition by weight of 49.0 to 53.0% $SiO_2$, 33.0 to 37.0% $Al_2O_3$ and 11.5 to 15.5% MgO.

The cordierite honeycomb structural body of the invention may be produced by mixing talc with a median particle diameter exceeding 7 $\mu$m and not greater than 20 $\mu$m and with a CaO content of 0.2 wt % or less and another cordierite raw material with a median particle diameter of not greater than 1 $\mu$m, molding the mixture into a honeycomb shape with a cell wall thickness of 130 $\mu$m or less, and firing the molded article.

The cordierite honeycomb structural body of the invention is a honeycomb structural body containing cordierite as the principal component. Cordierite has a theoretical composition represented by $2MgO.2Al_2O_3.5SiO_2$, which composition usually contains $SiO_2$ at 49.0 to 53.0 wt %, $Al_2O_3$ at 33.0 to 37.0 wt % and MgO at 11.5 to 15.5 wt %.

According to the invention, one of the starting materials used for production of the cordierite honeycomb structural body having this composition is talc with a median particle diameter exceeding 7 $\mu$m and not greater than 20 $\mu$m and with a CaO content of 0.2 wt % or less. If the median particle diameter of the talc is 7 $\mu$m or smaller, the talc particles have poorer orientation during extrusion molding, leading to a larger thermal expansion coefficient. If the particle diameter is greater than 20 $\mu$m, the size of the pores formed in the honeycomb structural body becomes too large, thus lowering the strength of the honeycomb structural body. This can also result in clogging of the molding frame during molding of the honeycomb structural body, thus causing complications when the honeycomb structural body is molded.

The Ca contained in the talc substitutes for the Mg in the cordierite crystals during firing, increasing the thermal expansion coefficient of the cordierite honeycomb structural body. The thermal expansion coefficient of the cordierite honeycomb structural body is determined by the density of microcracks generated in the honeycomb structural body due to the difference in the thermal expansion coefficient on the a, b axis (positive value) and the thermal expansion coefficient on the c axis (negative value) of the cordierite crystals, with a greater microcrack density resulting in a smaller thermal expansion coefficient. The theoretical value of the thermal expansion coefficient on the c axis of cordierite crystals is $-1.5 \times 10^{-6}/°$ C., but when the Ca substitutes for the Mg, the thermal expansion coefficient increases. Consequently, when talc having a CaO content of greater than 0.2 wt % is used, there is a smaller difference between the thermal expansion coefficient on the a,b axis and the thermal expansion coefficient on the c axis of the cordierite crystals, thus resulting in a lower density of microcracks generated in the honeycomb structural body and increasing the thermal expansion coefficient of the honeycomb structural body in the flow channel direction (A axis direction) to exceed $0.5 \times 10^{-6}/°$ C.

The cordierite materials used in addition to talc may be, for example, kaolin, kaolin obtained by calcination (hereunder referred to calcined kaolin), alumina, aluminum hydroxide or the like. All of these cordierite materials to be used in addition to the talc must have median particle diameters of not greater than 1 $\mu$m. This provides a honeycomb structural body with a density having a porosity of less than 18%, for improved strength. If even one of the cordierite materials used has a median particle diameter exceeding 1 $\mu$m, the porosity will be increased, thus reducing the compressive strength in the A axis direction. The median particle diameter of the cordierite material is preferably not greater than 0.8 $\mu$m, and more preferably not greater than 0.5 $\mu$m. The A axis and B axis directions of the honeycomb structural body are indicated by arrows in FIG. 1.

When calcined kaolin is used as a cordierite material in addition to talc, the weight proportion of calcined kaolin in the total starting material must be 36.5% or less. If the calcined kaolin content is greater than 36.5 wt %, the compressive strength on the A axis is reduced because of lower cordierite reactivity. This also results in lower density of microcracks generated in the honeycomb structural body, and a thermal expansion coefficient larger than $0.5 \times 10^{-6}/°$ C. in the flow channel direction (A axis direction). The porosity also exceeds 18%, making it impossible to make it sufficiently dense.

The cordierite materials are not limited to those mentioned above, and the sources of Mg, Al and Si may be their oxides, hydroxides, chlorides, etc. In this case as well, the median particle diameter of their material powders must be not greater than 1 $\mu$m.

When talc and one of the above-mentioned cordierite materials in addition to talc are used for the starting material to produce a cordierite honeycomb structural body according to the invention, those materials are combined to give the cordierite composition described above, and a binder or the like is added for kneading into a viscous clay. The clay is subjected to extrusion molding or the like to mold a honeycomb shape with a cell wall thickness of 130 $\mu$m or lower, and then fired into a honeycomb structural body. The cell wall thickness of the honeycomb structural body is preferably not greater than 100 $\mu$m to provide further reduction in the heat capacity.

EXAMPLES 1 to 10

Powdered talc, kaolin, alumina and aluminum hydroxide used as cordierite starting materials were combined in the mixing ratios indicated in Table 1 to prepare stock materials. The Ca content of the talc used was 0.12 to 0.13 wt %. Next, 7.5 parts by weight of methylcellulose as a binder, a sufficient amount of water and 2.8 parts by weight of a humectant were added to 100 parts by weight of each stock material, and kneading with a kneader produced a viscous clay. The clay was passed through an extrusion molding machine to mold a honeycomb shape with a cell wall thickness of 70 $\mu$m, 400 cells per square inch and square cell shapes, which was then subjected to firing in air in an electric furnace.

In order to evaluate the properties of each of the resulting honeycomb structural bodies, their thermal expansion coefficients in the flow channel direction (A axis direction) and their porosities and A axis compressive strengths were measured, giving the results listed in Table 1. The composition of the cordierite honeycomb structural body of Example 1 was examined and found to be 49.6 wt % $SiO_2$, 35.3 wt % $Al_2O_3$ and 13.6 wt % MgO.

TABLE 1

| | Mixing ratio (wt %) | | | | | Evaluation results | | |
|---|---|---|---|---|---|---|---|---|
| | Talc | Kaolin | Calcined kaolin | Alumina | Aluminum hydroxide | | | |
| Example | (median particle diameter: μm) | (median particle diameter: μm) | (median particle diameter: μm) | (median particle diameter: μm) | (median particle diameter: μm) | Thermal expansion coefficient (× $10^{-6}$/° C.) | Porosity (%) | A axis compressive strength (MPa) |
| 1 | 37.9 (20) | 42.2 (0.8) | — | 4.5 (0.9) | 15.4 (1.0) | 0.12 | 17.8 | 15.2 |
| 2 | 37.9 (20) | 42.2 (0.2) | — | 4.5 (0.4) | 15.4 (0.5) | 0.10 | 17.7 | 15.5 |
| 3 | 37.9 (16) | 42.2 (0.8) | — | 4.5 (0.9) | 15.4 (1.0) | 0.20 | 17.1 | 15.7 |
| 4 | 37.9 (16) | 42.2 (0.5) | — | 4.5 (0.4) | 15.4 (0.5) | 0.25 | 16.0 | 16.0 |
| 5 | 37.9 (16) | 42.2 (0.2) | — | 4.5 (0.4) | 15.4 (0.5) | 0.31 | 15.6 | 17.1 |
| 6 | 37.9 (11) | 42.2 (0.8) | — | 4.5 (0.9) | 15.4 (1.0) | 0.29 | 16.9 | 15.6 |
| 7 | 37.9 (11) | 42.2 (0.5) | — | 4.5 (0.5) | 15.4 (0.5) | 0.11 | 16.6 | 16.2 |
| 8 | 37.9 (11) | 42.2 (0.2) | — | 4.5 (0.4) | 15.4 (0.5) | 0.34 | 16.3 | 16.9 |
| 9 | 37.9 (8) | 42.2 (0.8) | — | 4.5 (0.9) | 15.4 (1.0) | 0.35 | 15.8 | 17.7 |
| 10 | 37.9 (8) | 42.2 (0.2) | — | 4.5 (0.4) | 15.4 (0.5) | 0.37 | 14.7 | 18.2 |

COMPARATIVE EXAMPLES 1 to 12

As shown in Table 2 for comparison, honeycomb structural bodies were obtained by mixing, molding and firing materials by the same method as for Examples 1–10 above, except that either of the median particle diameters of the talc or cordierite materials in addition to talc were outside of the ranges of the present invention (Comparative Examples 1–8). Honeycomb structural bodies were also obtained by the same method as for Examples 1–10, except that talc with a CaO content of 0.28 wt % was used in the starting material (Comparative Examples 9–12). The thermal expansion coefficients, porosities and A axis compressive strengths of each of the resulting honeycomb structural bodies were measured, giving the results listed in Table 2.

The results in Tables 1 and 2 will now be discussed. First, Examples 2, 5, 8 and 10 in Table 1 demonstrate that when the median particle diameter of the talc is reduced, the thermal expansion coefficient in the flow channel direction becomes larger while the porosity is lower and the A axis compressive strength is higher. When the median particle diameter of the talc is less than 7 μm as in Comparative Examples 7 and 8 in Table 2, the A axis compressive strength is increased, but the thermal expansion coefficient exceeds $0.5 \times 10^{-6}$/° C. Also, when the median particle diameter of the talc is greater than 20 μm as in Comparative Example 1, the thermal expansion coefficient is smaller but the porosity exceeds 18% and the A axis compressive strength is as low as 1.2 MPa. Furthermore, when the CaO content of the talc is greater than 0.2 wt % even if the median particle diameter of the talc is within the range of the present invention as in Comparative Examples 9 to 12, the thermal expansion coefficient increases above $0.5 \times 10^{-6}$/° C. Thus, the talc used in the starting material must have a median particle diameter greater than 7 μm but not greater than 20 μm, and a CaO content of 0.2 wt % or lower.

TABLE 2

| | Mixing ratio (wt %) | | | | | Evaluation results | | |
|---|---|---|---|---|---|---|---|---|
| | Talc | Kaolin | Calcined kaolin | Alumina | Aluminum hydroxide | | | |
| Comp. Example | (median particle diameter: μm) | (median particle diameter: μm) | (median particle diameter: μm) | (median particle diameter: μm) | (median particle diameter: μm) | Thermal expansion coefficient (× $10^{-6}$/° C.) | Porosity (%) | A axis compressive strength (MPa) |
| 1 | 37.9 (25) | 42.2 (0.2) | — | 4.5 (0.4) | 15.4 (0.5) | 0.12 | 25.5 | 10.2 |
| 2 | 37.9 (16) | 42.2 (0.5) | — | 4.5 (0.5) | 15.4 (1.5) | 0.20 | 28.6 | 9.3 |
| 3 | 37.9 (16) | 42.2 (0.5) | — | 4.5 (1.1) | 15.4 (0.5) | 0.16 | 26.5 | 11.1 |
| 4 | 37.9 (11) | 42.2 (1.5) | — | 4.5 (0.5) | 15.4 (0.5) | 0.33 | 27.9 | 9.9 |
| 5 | 37.9 | 42.2 | — | 4.5 | 15.4 | 0.21 | 29.7 | 8.2 |

TABLE 2-continued

| | Mixing ratio (wt %) | | | | | Evaluation results | | |
|---|---|---|---|---|---|---|---|---|
| Comp. Example | Talc (median particle diameter: μm) | Kaolin (median particle diameter: μm) | Calcined kaolin (median particle diameter: μm) | Alumina (median particle diameter: μm) | Aluminum hydroxide (median particle diameter: μm) | Thermal expansion coefficient (× 10⁻⁶/° C.) | Porosity (%) | A axis compressive strength (MPa) |
| 6 | 37.9 (11) | 42.2 (0.5) | — | 4.5 (1.1) | 15.4 (1.5) | 0.23 | 27.6 | 10.0 |
| 7 | 37.9 (11) | 42.2 (1.5) | — | 4.5 (1.1) | 15.4 (0.5) | 0.54 | 14.3 | 18.5 |
| 8 | 37.9 (6) | 42.2 (0.5) | — | 4.5 (0.4) | 15.4 (0.5) | 0.59 | 14.1 | 18.9 |
| 9 | 37.9*¹ (2) | 42.2 (0.5) | — | 4.5 (0.4) | 15.4 (0.5) | 0.77 | 16.0 | 16.2 |
| 10 | 37.9*¹ (14) | 42.2 (0.5) | — | 4.5 (0.4) | 15.4 (0.5) | 0.83 | 25.1 | 12.5 |
| 11 | 37.9*¹ (14) | 42.2 (0.5) | — | 4.5 (0.4) | 15.4 (1.5) | 0.59 | 24.4 | 12.6 |
| 12 | 37.9*¹ (14) | 42.2 (1.5) | — | 4.5 (0.4) | 15.4 (0.5) | 0.66 | 26.3 | 11.1 |

*¹CaO content of talc was 0.28% by weight. 0.12 to 0.13% in other talcs.

In regard to the porosity and A axis compressive strength, Examples 1 to 10 demonstrate that the porosity is smaller and the A axis compressive strength higher as the median particle diameter of the starting material decreases. When the median particle diameter of any of the cordierite materials exceeds 1 μm as in Comparative Examples 2–6 and 10–12, the porosity is greater than 18% and the A axis compressive strength is lower than 15 MPa. Thus, the median particle diameter of the cordierite materials other than talc must be not greater than 1 μm.

EXAMPLES 11 to 22

Using talc, kaolin, calcined kaolin and alumina as starting materials, their powders were combined in the mixing ratios indicated in Table 3 to prepare stock materials. These stock materials were used to obtain honeycomb structural bodies by molding and firing by the same method as in Examples 1 to 10. The thermal expansion coefficients, porosities and A axis compressive strengths of each of the resulting honeycomb structural bodies were measured, giving the results listed in Table 3.

COMPARATIVE EXAMPLES 13 to 24

As shown in Table 4 for comparison, honeycomb structural bodies were obtained by mixing, molding and firing materials by the same method as for Examples 11–22 above, except that the median particle diameters of the talc or of the cordierite materials in addition to talc were outside of the ranges of the present invention (Comparative Examples 13 to 16 and 18 to 21). Honeycomb structural bodies were also obtained by the same method except that in two cases talc with a CaO content of 0.28 wt % was used in the starting material (Comparative Examples 17, 22), while in two other cases the mixing ratio of the calcined kaolin was outside the range of the invention (Comparative Examples 23, 24). The thermal expansion coefficients, porosities and A axis compressive strengths of each of the resulting honeycomb structural bodies were measured, giving the results listed in Table 4.

TABLE 3

| | Mixing ratio (wt %) | | | | | Evaluation results | | |
|---|---|---|---|---|---|---|---|---|
| Example | Talc (median particle diameter: μm) | Kaolin (median particle diameter: μm) | Calcined kaolin (median particle diameter: μm) | Alumina (median particle diameter: μm) | Aluminum hydroxide (median particle diameter: μm) | Thermal expansion coefficient (× 10⁻⁶/° C.) | Porosity (%) | A axis compressive strength (MPa) |
| 11 | 40.5 (20) | 11.5 (0.8) | 34.5 (1.0) | 13.5 (1.0) | — | 0.19 | 17.9 | 15.3 |
| 12 | 40.5 (16) | 11.5 (0.5) | 34.5 (0.8) | 13.5 (0.4) | — | 0.20 | 16.5 | 17.1 |
| 13 | 40.5 (11) | 11.5 (0.5) | 34.5 (0.8) | 13.5 (0.4) | — | 0.23 | 16.9 | 16.9 |
| 14 | 40.5 (11) | 11.5 (0.5) | 34.5 (0.6) | 13.5 (0.4) | — | 0.27 | 14.6 | 18.4 |
| 15 | 40.5 (11) | 11.5 (0.5) | 34.5 (0.3) | 13.5 (0.5) | — | 0.31 | 13.7 | 18.9 |
| 16 | 40.5 | 11.5 | 34.5 | 13.5 | — | 0.24 | 12.0 | 20.9 |

TABLE 3-continued

| | Mixing ratio (wt %) | | | | | Evaluation results | | |
|---|---|---|---|---|---|---|---|---|
| | Talc | Kaolin | Calcined kaolin | Alumina | Aluminum hydroxide | | | |
| Example | (median particle diameter: μm) | (median particle diameter: μm) | (median particle diameter: μm) | (median particle diameter: μm) | (median particle diameter: μm) | Thermal expansion coefficient (× 10⁻⁶/° C.) | Porosity (%) | A axis compressive strength (MPa) |
| 17 | (11) 40.5 | (0.5) 28.8 | (0.8) 17.2 | (0.5) 13.5 | — | 0.08 | 16.4 | 16.5 |
| 18 | (20) 40.5 | (0.8) 28.8 | (1.0) 17.2 | (1.0) 13.5 | — | 0.17 | 15.2 | 17.3 |
| 19 | (16) 40.5 | (0.5) 28.8 | (0.8) 17.2 | (0.4) 13.5 | — | 0.19 | 15.0 | 17.4 |
| 20 | (16) 40.5 | (0.5) 28.8 | (0.8) 17.2 | (0.5) 13.5 | — | 0.23 | 14.8 | 17.6 |
| 21 | (11) 40.5 | (0.5) 28.8 | (0.8) 17.2 | (0.4) 13.5 | — | 0.29 | 10.5 | 19.1 |
| 22 | (11) 40.5 | (0.5) 28.8 | (0.3) 17.2 | (0.5) 13.5 | — | 0.47 | 9.7 | 19.3 |
| | (8) | (0.5) | (0.8) | (0.4) | | | | |

TABLE 4

| | Mixing ratio (wt %) | | | | | Evaluation results | | |
|---|---|---|---|---|---|---|---|---|
| | Talc | Kaolin | Calcined kaolin | Alumina | Aluminum hydroxide | | | |
| Comp. Example | (median particle diameter: μm) | (median particle diameter: μm) | (median particle diameter: μm) | (median particle diameter: μm) | (median particle diameter: μm) | Thermal expansion coefficient (× 10⁻⁶/° C.) | Porosity (%) | A axis compressive strength (MPa) |
| 13 | (25) 40.5 | (0.5) 11.5 | (0.8) 34.5 | (0.5) 13.5 | — | 0.05 | 27.3 | 9.1 |
| 14 | (16) 40.5 | (0.5) 11.5 | (0.6) 34.5 | (1.5) 13.5 | — | 0.15 | 23.7 | 11.8 |
| 15 | (11) 40.5 | (0.5) 11.5 | (1.1) 34.5 | (0.5) 13.5 | — | 0.20 | 19.1 | 13.6 |
| 16 | (11) 40.5 | (1.5) 11.5 | (0.8) 34.5 | (0.4) 13.5 | — | 0.18 | 20.9 | 12.7 |
| 17 | (14) 40.5*¹ | (0.5) 11.5 | (0.8) 34.5 | (0.5) 13.5 | — | 0.68 | 16.7 | 16.0 |
| 18 | (25) 40.5 | (0.5) 28.8 | (0.8) 17.2 | (0.5) 13.5 | — | 0.03 | 25.6 | 10.1 |
| 19 | (11) 40.5 | (0.5) 28.8 | (0.8) 17.2 | (1.5) 13.5 | — | 0.11 | 21.5 | 12.6 |
| 20 | (11) 40.5 | (0.5) 28.8 | (1.1) 17.2 | (0.5) 13.5 | — | 0.10 | 18.9 | 14.5 |
| 21 | (16) 40.5 | (1.5) 28.8 | (0.7) 17.2 | (0.4) 13.5 | — | 0.07 | 19.5 | 13.3 |
| 22 | (14) 40.5*¹ | (0.5) 28.8 | (0.8) 17.2 | (0.5) 13.5 | — | 0.72 | 15.3 | 17.6 |
| 23 | (11) 40.5 | (0.5) 9.0 | (0.8) 37.0 | (0.5) 13.5 | — | 0.51 | 18.5 | 14.2 |
| 24 | (11) 40.5 | — | (0.8) 46.0 | (0.5) 13.5 | — | 0.58 | 29.2 | 8.7 |
| 25 | (2) 40.5 | (0.5) 11.5 | (0.8) 34.5 | (0.5) 13.5 | — | 0.75 | 14.2 | 19.9 |

*¹CaO content of talc was 0.28% by weight. 0.12 to 0.13% in other talcs.

From Tables 3 and 4 it can be confirmed that even when calcined kaolin was used in the starting material, the same effects are achieved on the thermal expansion coefficient by the particle diameter of the talc as seen in Examples 12, 13 and Comparative Example 13 and by the weight ratio of CaO in the talc as seen in Examples 12, 18 and Comparative Examples 17 and 22. Also, the same effects were achieved on the porosity and A axis compressive strength by the particle diameters of the cordierite materials, as seen by comparing Examples 11 to 22 and Comparative Examples 13 to 16 and 18 to 21.

It can also be seen that when the mixing ratio of the calcined kaolin was reduced as in Examples 17, 18, 20 and 21, the thermal expansion coefficient was reduced, the porosity is lower and the A axis compressive strength was higher in comparison to Examples 11, 12, 13 and 15. In addition, when the weight ratio of the calcined kaolin was increased to over 36.5% as in Comparative Examples 23 and 24, the porosity exceeded 18% and the A axis compressive strength was lower than 15 MPa, while the thermal expansion coefficient was greater than $0.5 \times 10^{-6}/°$ C. Thus, when calcined kaolin is used as a cordierite material, it is preferably used in a weight ratio of not greater than 36.5% with respect to the total starting material.

The thermal expansion coefficient and compressive strength on the B axis (indicated by an arrow in FIG. 1) were measured for Example 16 and Comparative Example 15. Referring to those results, the thermal expansion coefficient was $0.68 \times 10^{-6}/°$ C. and the B axis compressive strength was 1.36 MPa in Example 16. In Comparative Example 15, the thermal expansion coefficient was $0.66 \times 10^{-6}/°$ C. and the B axis compressive strength was 1.23 MPa.

Figure 2:
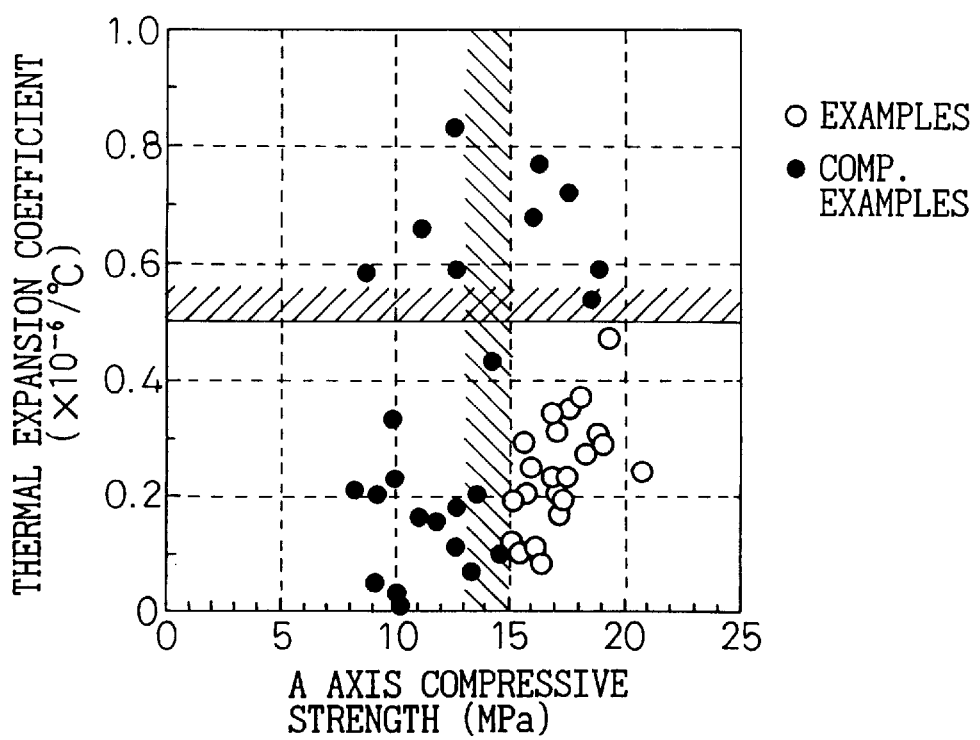
FIG. 2 is a graph showing the relationship between A axis strength and thermal expansion coefficient for the examples of the invention and the comparative examples.

FIG. 2 is a graph with the A axis compressive strengths plotted on the horizontal axis and the thermal expansion coefficients plotted on the vertical axis. All of the examples of the invention had thermal expansion coefficients of less than $0.5 \times 10^{-6}/°$ C. and A axis compressive strengths of 15 MPa or greater with a cell wall thickness of 70 μm, demonstrating that according to the invention it is possible to ensure both a low thermal expansion coefficient and high strength. FIG. 3 is a graph with the porosities plotted on the horizontal axis and the thermal expansion coefficients plotted on the vertical axis, showing likewise that all of the examples of the invention had thermal expansion coefficients of less than $0.5 \times 10^{-6}/°$ C. and porosities of less than 18%. In contrast, the comparative examples either had thermal expansion coefficients of greater than $0.5 \times 10^{-6}/°$ C. or porosities of 18% or greater with A axis compressive strengths lower than 15 MPa.

Thus, according to the invention it is possible to realize thin-walled and high strength cordierite honeycomb structural bodies with low thermal expansion coefficients, by restricting the median particle diameter and CaO content of the talc and the median particle diameter of the cordierite materials other than talc to within prescribed ranges.

We claim:

1. A cordierite honeycomb structural body characterized by being a honeycomb structural body composed mainly of cordierite, wherein a starting material comprises talc with a median particle diameter exceeding 7 μm and not greater than 20 μm and with a CaO content of 0.2 wt. % or less, and a raw material for making cordierite with a median particle diameter of not greater than 1 μm, said starting material being molded and fired so as to give a cell wall thickness of 130 μm of less.

2. The cordierite honeycomb structural body according to claim 1, wherein the median particle diameter of said raw material is not greater than 0.8 μm.

3. The cordierite honeycomb structural body according to claim 1, wherein said raw material includes calcined kaolin, and the content of the calcined kaolin in said starting material is 36.5 wt % or less.

4. The cordierite honeycomb structural body according to any of claims 1 to 3, wherein said raw material comprises kaolin and alumina.

5. The cordierite honeycomb structural body according to claim 1, wherein said cell wall thickness is 100 μm or less.

6. The cordierite honeycomb structural body according to claim 2, wherein said cell wall thickness is 100 μm or less.

7. The cordierite honeycomb structural body according to claim 3, wherein said cell wall thickness is 100 μm or less.

8. The cordierite honeycomb structural body according to claim 4, wherein said cell wall thickness is 100 μm or less.

9. The cordierite honeycomb structural body according to claim 1, wherein the thermal expansion coefficient of said honeycomb structural body in the direction of the flow channel is not greater than $0.5 \times 10^{-6}/°$ C., and the porosity of said honeycomb structural body is less than 18%.

10. The cordierite honeycomb structural body according to claim 2, wherein the thermal expansion coefficient of said honeycomb structural body in the direction of the flow channel is not greater than $0.5 \times 10^{-6}/°$ C., and the porosity of said honeycomb structural body is less than 18%.

11. The cordierite honeycomb structural body according to claim 3, wherein the thermal expansion coefficient of said honeycomb structural body in the direction of the flow channel is not greater than $0.5 \times 10^{-6}/°$ C., and the porosity of said honeycomb structural body is less than 18%.

12. The cordierite honeycomb structural body according to claim 4, wherein the thermal expansion coefficient of said honeycomb structural body in the direction of the flow channel is not greater than $0.5 \times 10^{-6}/°$ C., and the porosity of said honeycomb structural body is less than 18%.

13. The cordierite honeycomb structural body according to claim 5, wherein the thermal expansion coefficient of said honeycomb structural body in the direction of the flow channel is not greater than $0.5 \times 10^{-6}/°$ C., and the porosity of said honeycomb structural body is less than 18%.

14. The cordierite honeycomb structural body according to claim 6, wherein the thermal expansion coefficient of said honeycomb structural body in the direction of the flow channel is not greater than $0.5 \times 10^{-6}/°$ C., and the porosity of said honeycomb structural body is less than 18%.

15. The cordierite honeycomb structural body according to claim 7, wherein the thermal expansion coefficient of said honeycomb structural body in the direction of the flow channel is not greater than $0.5 \times 10^{-6}/°$ C., and the porosity of said honeycomb structural body is less than 18%.

16. The cordierite honeycomb structural body according to claim 8, wherein the thermal expansion coefficient of said honeycomb structural body in the direction of the flow channel is not greater than $0.5 \times 10^{-6}/°$ C., and the porosity of said honeycomb structural body is less than 18%.

17. A cordierite honeycomb structural body according to claim 1, wherein the cordierite which is the main component of said honeycomb structural body has a composition by weight of 49.0 to 53.0% $SiO_2$, 33.0 to 37.0% $Al_2O_3$ and 11.5 to 15.5% MgO.

18. A method for producing a cordierite honeycomb structural body, characterized by mixing talc with a median particle diameter exceeding 7 μm and not greater than 20 μm and with a CaO content of 0.2 wt. % or less and a raw material for making cordierite with a median particle diameter of not greater than 1 μm, molding the mixture into a honeycomb shape with a cell wall thickness of 130 μm or less, and firing the mold.

19. The method according to claim 18, wherein said raw material comprises kaolin and alumina.

* * * * *